F. WORLEY, J. H. TROWBRIDGE, C. WURTENBERG AND C. LEE.
BRAKE AND DRIVE CONTROL MECHANISM.
APPLICATION FILED DEC. 30, 1916.
1,311,939.
Patented Aug. 5, 1919.
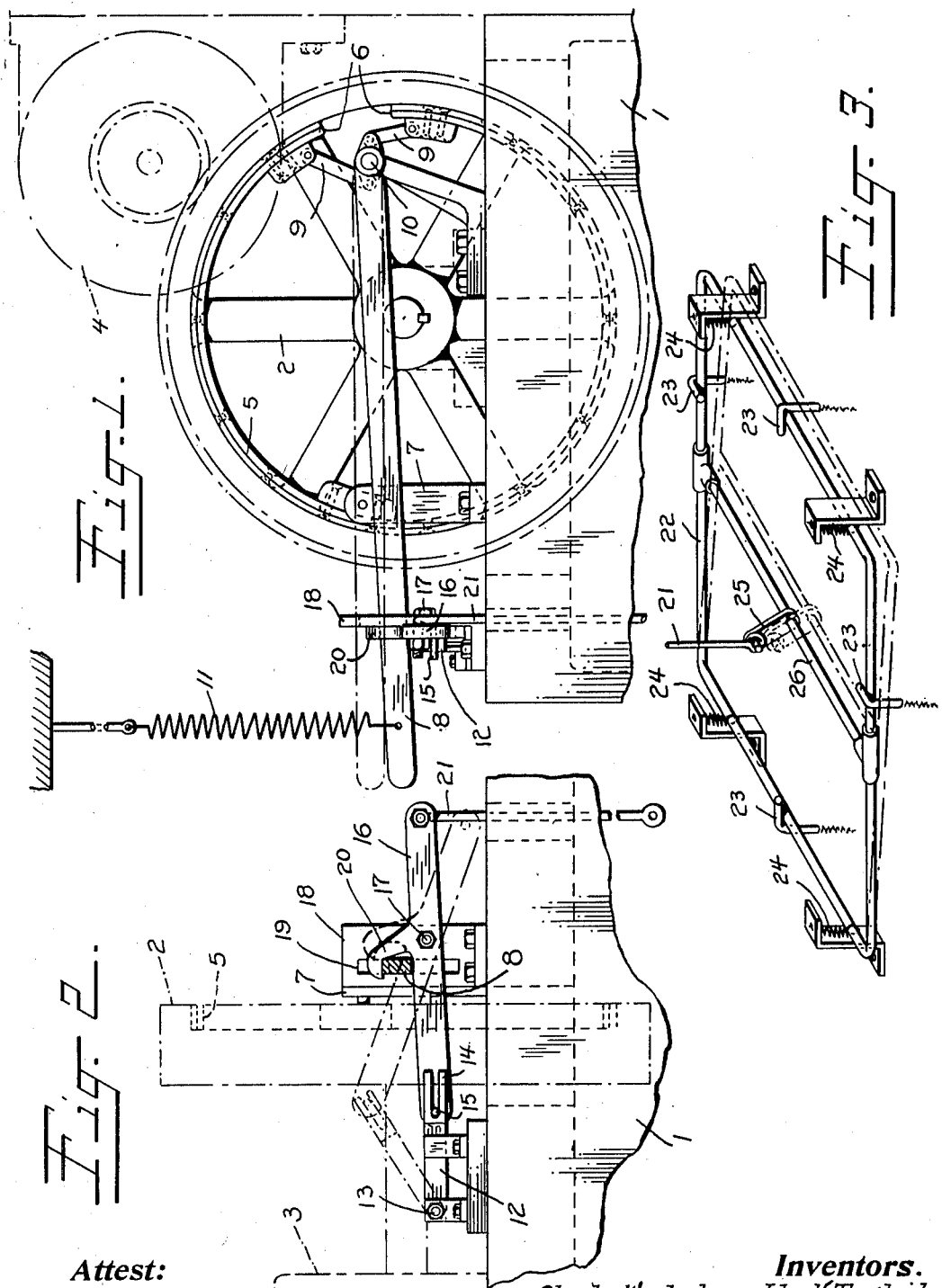
Attest:
Inventors.
Charles Wurtenberg, John H. Trowbridge,
by Clifford Lee and Floyd Worley
their Atty.

UNITED STATES PATENT OFFICE.

FLOYD WORLEY, JOHN H. TROWBRIDGE, AND CHARLES WURTENBERG, OF NAUGATUCK, CONNECTICUT, AND CLIFFORD LEE, OF NEW BRUNSWICK, NEW JERSEY, ASSIGNORS TO THE GOODYEAR'S METALLIC RUBBER SHOE COMPANY, A CORPORATION OF CONNECTICUT.

BRAKE AND DRIVE-CONTROL MECHANISM.

1,311,939.     Specification of Letters Patent.     Patented Aug. 5, 1919.

Continuation of application Serial No. 21,590, filed April 15, 1915. This application filed December 30, 1916. Serial No. 139,813.

*To all whom it may concern:*

Be it known that we, FLOYD WORLEY, JOHN H. TROWBRIDGE, and CHARLES WURTENBERG, citizens of the United States, and residing at Naugatuck, county of New Haven, and State of Connecticut, and CLIFFORD LEE, a citizen of the United States, and residing at New Brunswick, county of Middlesex, and State of New Jersey, have invented certain new and useful Improvements in Brake and Drive-Control Mechanisms, of which the following is a full, clear, and exact description.

This invention relates to brake and drive-control mechanisms and more particularly to a brake and drive-control mechanism in which the actuation of the brake and drive-control are each dependent upon one another.

One object of the invention is to provide a simple and inexpensive device of the kind described in which upon disconnection of the driving means and operation of the brake further driving of the device will be prevented until the brake is manually released. Another object of the invention is to provide a device of the kind mentioned in which when the drive-control is operated to disconnect a machine and source of power the brake will be instantly applied without further action on the part of the operator.

This case is a continuation of our former application, Serial No. 21,590, filed April 15, 1915.

In the accompanying drawing wherein is shown one of the possible embodiments of the invention, Figure 1 is a side elevation showing the combined brake and drive-control mechanism constructed in accordance with the invention;

Fig. 2 is an end elevation of the same, certain parts being shown in dot and dash lines for the sake of clearness; and Fig. 3 is a perspective view of the foot-pedal mechanism for operating the drive-control.

Referring now to the drawing, the numeral 1 indicates a support upon which is mounted a drive member 2 such as a gear for a machine 3, for example, a mixing mill. The machine is adapted to be driven through the gear 2 by a suitable source of power here shown as a motor 4.

Mounted upon the support 1 adjacent the gear 2 is a braking device adapted to operate within the periphery of the gear. The braking device is of the expansion type and comprises a broken ring or shoe 5 supported intermediate its ends 6 by a bracket 7, the bracket being situated substantially diametrically opposite the opening between the ends. The ends 6 are pivotally joined to a manually-operated lever 8 through links 9 which are pivoted to the lever 8 on opposite sides of the fulcrum 10. Upon movement of the lever 8 in one direction the links will expand the shoe against the inner face of the gear, and upon movement in the other direction the shoe will be retracted from the gear. A coil spring 11 is connected to the end of the lever 8 opposite the fulcrum and tends to move the lever to set the brake when the lever is released by operation of the drive-control mechanism described below.

The drive of the machine 3 by the motor 4 is controlled as shown in this embodiment by a knife-switch 12 mounted on the support 1, the switch being located in any desired circuit whose interruption will cause the motor to stop. The knife is pivoted at 13 and its free end 14 is forked. Slidably mounted in the forked portion is a pin 15 situated upon the end of the lever 16 which is mounted on a pivot 17 attached to an upright bracket 18 mounted on the support 1. The pivot 17 is located to one side of a slot 19 in the bracket through which projects the brake-lever 8 which crosses the upper edge of the lever 16. The levers 8 and 16 are adapted to be interlocked during the driving of the machine by means of a hooked arm 20, the hooked arm 20 projecting upwardly from the lever 16 adjacent the pivotal point 17 and engaging the top edge of the lever 8.

As noted the switch and brake-levers are in interlocking engagement when the machine is being driven and the drive may be cut out and the brake applied at the same time and substantially instantaneously. This interruption of the drive and simultaneous braking is controlled through a rod 21 which is pivotally attached to the end of the lever 16 opposite the pin 15. The rod 21 is adapted to be operated through a rectangular frame 22 serving as a foot-pedal which preferably extends entirely around the machine and thus may be easily reached at any given point. The frame is pressed against stops 23 by means of suitably supported coil springs 24 arranged adjacent the corners of the frame. When one part of the frame is depressed the part opposite will fulcrum against the stops associated therewith. The motion of the frame is communicated to the rod 21 by an arm 25 attached to a central cross bar 26 running from side to side of the frame.

In operation, when it is desired to stop the machine abruptly in case of accident or for other reason the operator need only depress the frame 22 with his foot from a position most convenient to him whereupon the switch will be moved to break the current to the motor and the hook 20 will release the brake-lever 8 which, actuated by the spring 11, will fly to full braking position. Having reached the position, as shown by dotted lines in Fig. 2, it will be observed that the brake-lever lies in the path of motion of the hook and thus the switch may not be closed until the brake has been manually released by depressing the brake-lever 8 until its upper edge comes to a position so that the lower edge of the hook 20 may pass thereover. When this position has been reached the hook 20 will be thrown to the left in Fig. 2 by the motion of lever 16 actuated by springs 24 which tend to hold the lever in the position shown in full lines in Fig. 2. The motion of the lever 16 is communicated also through the pin 15 and the fork 14 to the switch-lever 12, and when the hook 20 has come to rest overlying the upper edge of the brake-lever 8 this switch will be closed. It will thus be seen that upon manual depression of the brake-lever 8 the switch-lever will be automatically closed thereby providing an automatic means for connecting the motor 4 with the machine 3.

Having thus described our invention what we claim and desire to protect by Letters Patent is:—

1. The combination with a brake-shoe and a power control arm, of respective levers for operating the shoe and the power control arm, a catch carried by one of the levers and engaging the other lever thereby holding said control arm in position for the transmission of power and the brake released, means for releasing said catch and means for moving the brake-lever to set the brake-shoe upon release of said catch, the brake-lever by such movement assuming a position effective to prevent movement of the control arm into active position while the brake is set.

2. The combination with a brake shoe and an electric switch, of respective levers for operating the shoe and the switch, said levers crossing each other, a catch carried by one of the levers and engaging the other lever at or near the intersection of the levers and holding said switch closed and the brake released, means for releasing said catch, and means for moving the brake-lever to set the brake shoe upon release of said catch, the brake-lever moving into the path of said catch and preventing sufficient movement of the switch-lever to close the switch while the brake is set.

3. The combination with a brake shoe and an electric switch, of a lever for operating the brake shoe, a tension member for moving said lever to set the brake shoe, a rock lever connected to said switch for operating the switch, a catch carried by the rock lever and engaging the brake lever and holding the latter depressed against the pull of said tension member in which position of the parts the switch is closed and the brake shoe released, and means for rocking said rock lever on its pivot to withdraw said catch from the brake lever thereby simultaneously opening the switch and freeing the brake lever for movement to operative position by said tension member.

4. In combination, a machine, a brake comprising a brake shoe and a tension brake-lever, a drive for the machine comprising an electric motor, a circuit-breaking switch and a switch-lever, said switch-lever and said brake-lever being interlocked during the driving of the machine by a hook on said switch-lever engaging said brake-lever and holding it in open position against the tension thereon, and means to actuate said switch-lever to open said switch and to unhook said brake-lever to permit thereby a substantially instantaneous application of the brake.

Signed at Naugatuck, county of New Haven and State of Connecticut, this 16th day of December 1916.

FLOYD WORLEY.
JOHN H. TROWBRIDGE.
CHARLES WURTENBERG.

Signed at New Brunswick, county of Middlesex and State of New Jersey, this 9th day of December 1916.

CLIFFORD LEE.